United States Patent
Becker et al.

(10) Patent No.: US 6,318,238 B1
(45) Date of Patent: Nov. 20, 2001

(54) WOBBLING DRIVE OF AN AXIAL PISTON MACHINE

(75) Inventors: Klaus Becker, Herzogenaurach; Berthold Braun, Hochstadt; Boris Baumann, Seligenstadt; Robert Nathan, Backnang, all of (DE)

(73) Assignee: Alfred Karcher GmbH & Co., Winnenden (DE)

( * ) Notice: Subject to any disclaimer, the term of this patent is extended or adjusted under 35 U.S.C. 154(b) by 0 days.

(21) Appl. No.: 09/486,254

(22) PCT Filed: Jul. 24, 1998

(86) PCT No.: PCT/EP98/04657

§ 371 Date: Apr. 14, 2000

§ 102(e) Date: Apr. 14, 2000

(87) PCT Pub. No.: WO99/11928

PCT Pub. Date: Mar. 11, 1999

(30) Foreign Application Priority Data

Aug. 28, 1997 (DE) ............................................... 197 37 540

(51) Int. Cl.[7] .................................................... F01B 1/00
(52) U.S. Cl. ............................................................ 92/72
(58) Field of Search .................................. 92/71; 91/499

(56) References Cited

U.S. PATENT DOCUMENTS

| 1,748,907 | 2/1930 | Vallance . | |
|---|---|---|---|
| 2,138,194 | * 11/1938 | Pfauser | 417/269 |
| 2,920,488 | 1/1960 | Savage . | |
| 2,947,182 | * 8/1960 | Wahlmark | 92/187 X |
| 3,151,528 | 10/1964 | Eastman | 91/507 |
| 3,249,052 | * 5/1966 | Karlak | 417/269 X |
| 4,640,144 | * 2/1987 | McLendon | 91/499 X |
| 5,934,887 | * 8/1999 | Veit | 92/17 X |
| 6,138,549 | * 10/2000 | Braun et al. | 92/71 |

FOREIGN PATENT DOCUMENTS

| 674888 | * 11/1963 | (CA) | 91/499 |
|---|---|---|---|
| 348322 | * 9/1960 | (CH) | 91/499 |
| 2334723 | 1/1975 | (DE) . | |
| 3400633 | 7/1985 | (DE) . | |
| 3612936 | 10/1987 | (DE) . | |
| 3901856 | 11/1989 | (DE) . | |
| 91121701 | 12/1992 | (DE) . | |
| 3904659 | 3/1993 | (DE) . | |
| 3435438 | 5/1993 | (DE) . | |
| 29521011 | 8/1996 | (DE) . | |
| 19635335 | 8/1997 | (DE) . | |
| 672173 | 8/1950 | (GB) . | |
| 674892 | 7/1952 | (GB) . | |
| WO9216774 | 10/1992 | (WO) . | |
| WO9617694 | 6/1996 | (WO) . | |

* cited by examiner

*Primary Examiner*—John E. Ryznic
(74) *Attorney, Agent, or Firm*—Volpe and Koenig, P.C.

(57) ABSTRACT

A wobble drive in an axial piston machine, particularly the axial piston pump of a high-pressure cleaning device, having a wobble body (1) rotatable around an axis of rotation (D) and a wobble plate (2) driving with its front side at least one piston (10a) positioned parallel to the axis of rotation D, a roller bearing (3) positioned between the wobble body (1) and the wobble plate (2) exhibiting a bearing axis inclined to the axis of rotation (D). In order to insure even at elevated rotary speeds of the wobble body (1) and thus also of the rolling bodies (6) that the rolling bodies (6) are securely held in their races (4,5) in spite of the elevated centrifugal forces acting on them, it is proposed that the wobble plate (2) be provided with a rim (7) overlapping the wobble body (1), with the rolling bodies (6) being positioned between the rim (7) and the wobble body (1).

15 Claims, 1 Drawing Sheet

WOBBLING DRIVE OF AN AXIAL PISTON MACHINE

FIELD OF THE INVENTION

The present invention concerns the wobble drive of an axial piston machine. Such wobble drives involve a wobble or swash plate which drives via its front side at least one piston which is positioned parallel or even inclined to the axis of rotation of the wobble plate. The invention also particularly concerns high-pressure cleaning units in which such wobble drives are part of an axial piston pump.

BACKGROUND OF THE INVENTION

Known from EP-A 0242550 is a high-pressure cleaning unit in which a wobble body is mounted in a rotationally fixed manner on the drive shaft of an electric motor. Additionally provided is a wobble plate arranged at an incline to the drive shaft, the front side of the wobble plate driving several pistons positioned parallel to the axis of rotation of the drive shaft. An axial-groove ball bearing is positioned between the wobble body and the wobble plate. The axial-groove ball bearing is provided with ball grooves and balls rolling in the grooves. The increasing demands on the performance of such high-pressure cleaning units require an increase in the rotary speed of the drive shaft. At elevated rotary drive speeds, substantially increased centrifugal forces act on the balls of known axial-groove ball bearings so that there is a danger that the load distribution on the races will shift from one of uniform loading to a loading of the outer edge areas of the ball grooves. The associated wear and possibly reduced rollability of the balls is undesired. In addition, there is the danger that as a result of the increased edge loading, the races will become deformed such that the balls will be slung radially from the race path.

SUMMARY OF THE INVENTION

The object of the present invention is therefore to further develop the wobble drive of an axial piston machine according to the introductory clause of claim 1 such that one insures that the rolling bodies are securely held in their race paths even at elevated rotary drive speeds. According to the present invention, this problem is solved as a result of the fact that the wobble plate is provided with a rim overlapping the wobble body, the rolling bodies being positioned between the rim and the wobble body. The rolling bodies are unable to the leave their race path because the rim securely holds them therein. Since wobble plates are preferably lightweight in order to reduce dynamic forces, they are usually made from thin sheet metal. The rim provided by the present invention thus fulfills a further function in addition to that of securing the balls: the wobble plate is favorably strengthened in its rigidity by the angled rim.

In the case of the ball bearing, one is preferably dealing with an angular-contact ball bearing with balls rolling in its races. The load angle is set such that the balls are simply pressed more intensely against the races even at elevated rotary drive speeds. If one is dealing with a hollow cylindrical wobble body, for example, of thin sheet metal, the end facing the wobble plate can be readily reshaped to form the ball race. This can be accomplished, for example, by stamping or using a deep-drawing process.

Preferably, the rim is joined by a corner section as one piece with the wobble plate, the corner section incorporating the ball race. In this especially favorably embodiment, no separate production step is necessary for producing the ball race.

At the end facing away from the wobble plate, the wobble body exhibits an inwardly directed radial flange forming a receptacle for a drive shaft. The radial flange advantageously increases the rigidity of the wobble body.

For reliable radial and axial support of the drive shaft, the wobble drive is provided with two angular-contact ball bearings, one being positioned between the wobble plate and the wobble body and the other between the wobble body and a housing, the bearing axis of the second angular-contact ball bearing being coaxial with the axis of rotation of the drive shaft. The end of the drive shaft facing the wobble drive is accordingly securely supported radially against the housing via the wobble body and the second angular-contact ball bearing. If both angular-contact ball bearings are incorporated in an X-arrangement in the wobble drive, axial supporting forces will not be transferred to the drive shaft, but via the second angular-contact ball bearing to the housing. In this case, it is possible to form a ball race at each end of the wobble body. This preferably occurs by reshaping such as can be accomplished, for example, by stamping or using the deep-drawing process.

Both the wobble body as well as the wobble plate of the wobble drive of the present invention are especially suited to manufacture in a non-machining process, especially a deep-drawing process, such that thin sheet metal can be employed.

BRIEF DESCRIPTION OF THE DRAWINGS

The invention is described in more detail below using two embodiments as shown in two figures. These include.

DETAILED DESCRIPTION OF THE DRAWINGS

Figure 1:
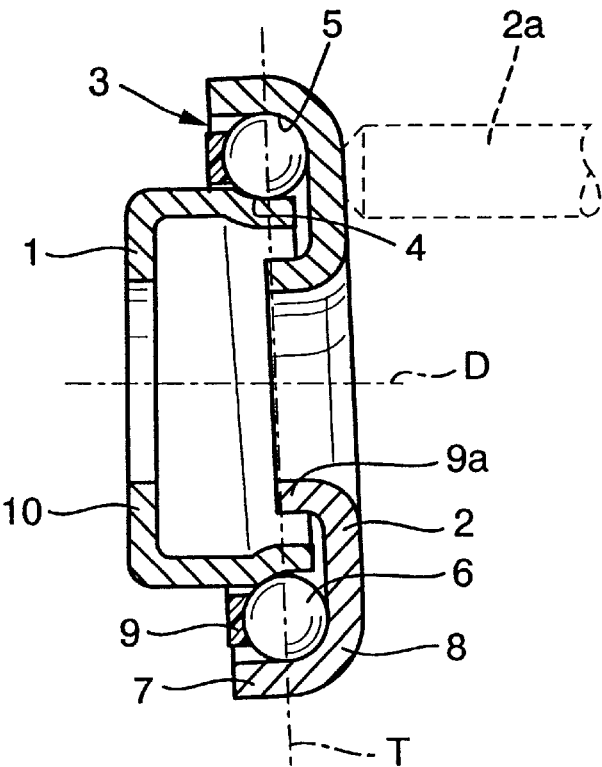
FIG. 1 which is a longitudinal section through a wobble drive according to the present invention.

FIG. 1 shows in longitudinal section a wobble drive according to the present invention, the drive exhibiting a wobble body 1 rotatable around an axis of rotation D and a wobble plate 2 positioned at an incline to the axis of rotation D. The front side of the wobble plate 2 drives piston 2a positioned parallel to the axis of rotation D. Located between the wobble body 1 and the wobble plate 2 is an angular-contact ball bearing 3, which is provided with ball races 4,5 on which balls 6 roll. The piston 2a positioned parallel to the axis of rotation D lies against the front side of the wobble plate 2. As a result of the wobbling movement of the wobble plate 2, the piston 2a moves axially. The bearing axis of the angular-contact ball bearing 3 is inclined to the axis of rotation D. In this way, the angular-contact ball bearing 3 and the wobble plate 2 wobble in a wobble plane T.

The wobble plate 2 is provided with a rim 7 which radially overlaps the wobble body 1. The balls 6 are positioned between wobble body 1 and rim 7. The ball race 5 is formed by a corner section 8 of the rim 7 combined as one piece with wobble plate 2. Following the shaping of the wobble plate 2 to produce the rim 7, the ball race 5 is preferably immediately formed without requiring a separate production step. The ball race 4 is likewise formed by shaping the axial end of the wobble body 1 facing the wobble plate 2. Since the end is tapered, ball cage 9 completely equipped with balls 6 can be shoved onto this end of the wobble body.

The wobble plate 2 exhibits on its inner periphery another integrally formed axially directed rim 9a which increases the rigidity of the wobble plate 2. On its end opposite wobble plate 2, the wobble body 1 exhibits an inwardly directed radial flange 10 with a receptacle for a drive shaft (not shown). The radial flange 10 increases the rigidity of a wobble body 1 formed from thin sheet metal.

Figure 2:
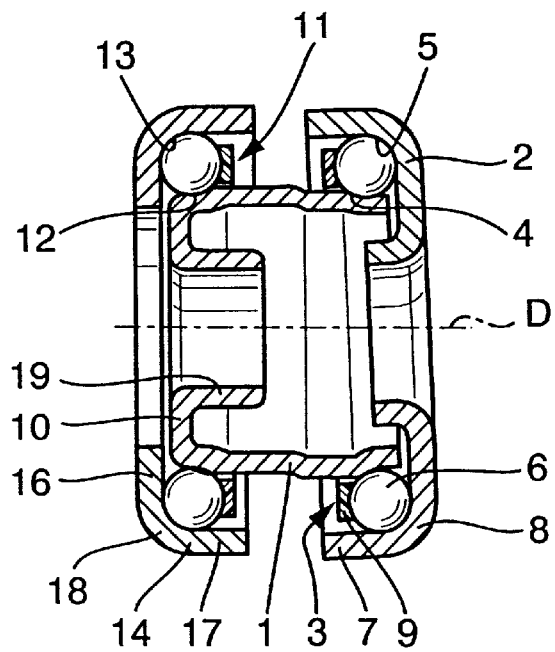
FIG. 2 which is a longitudinal section through another wobble drive according to the present invention.

The wobble drive shown in FIG. 2 differs from that shown in FIG. 1 essentially through the fact that another angular-contact ball bearing 11 is provided at the end of wobble plate 2 opposite wobble plate 2. A ball race 12 is provided at the end of wobble body 1, the ball race 12 being produced in the same way as with the angular-contact ball bearing already described above. Another ball race 13 is formed on an outer ring 14, the outer ring 14 being attached to an unshown housing. The bearing axis of angular-contact ball bearing 11 is coaxial with axis of rotation D. The outer ring exhibits a disk-shaped part 16 and an axially directed rim 17 joined together as one piece by a corner section 18. The ball race 13 is formed in advantageous fashion on a corner section 18 without requiring a special production step. Another difference from the above-described embodiment consists in the fact that the radial flange 10 of wobble body 1 is provided with a coaxially positioned and axially inwardly directed tubular socket 19 which is mounted on the unshown drive shaft.

In both of the embodiments described, it insured in the case of all of the angular-contact ball bearings that there is no edge loading of the races even at elevated rotary speeds due to increasing centrifugal forces.

List of Elements 1 wobble body
2 wobble plate
2a piston
3 angular-contact ball bearing
4 ball race
5 ball race
6 ball
7 rim
8 corner section
9 ball cage
9a rim
10 radial flange
11 angular-contact ball bearing
12 ball race
13 ball race
14 outer ring
15 (not used)
16 disk-shaped part
17 rim
18 corner section
19 tubular socket

What is claimed is:

1. A wobble drive of an axial piston machine for an axial piston pump in a high-pressure cleaning device, comprising a wobble body (1) rotatable around an axis of rotation (D) and a wobble plate (2) inclined to the axis of rotation (D) and driving with a front side thereof at least one piston (2a), a roller bearing (3) positioned between the wobble body (1) and the wobble plate (2), the wobble plate (2) includes a rim (7) overlapping the wobble body (1), rolling bodies (6) of the roller bearing (3) are positioned between the rim (7) and the wobble body (1), and an end of the wobble body (1) opposite the wobble plate (2) includes an inwardly directed radial flange (10) with a receptacle (11, 19) for a drive shaft.

2. The wobble drive of claim 1, wherein at least one angular-contact ball bearing (3,11) is provided in which balls (6) roll in the races (4,5,12,13).

3. The wobble drive of claim 2, wherein the hollow cylindrical wobble body (1) incorporates one of the ball races (4) on an end thereof facing the wobble plate (2).

4. The wobble drive of claim 2, wherein one of the ball races (5, 13) is formed on a corner section (8) of the rim (7) combined as one piece with the wobble plate (2).

5. The wobble drive of claim 1, further including two angular-contact ball bearings (3, 11), one of which is positioned between the wobble plate (2) and the wobble body (1) and the other between the wobble body (1) and a housing, the bearing axis of the second angular-contact ball bearing (11) being positioned coaxial with the axis of rotation (D).

6. The wobble drive of claim 5, wherein one of the ball races (4,12) is formed on each of two axial ends of the wobble body (1).

7. The wobble drive of claim 5, wherein the two angular-contact ball bearings (3,13) exhibit an X arrangement.

8. The wobble drive of claim 1, wherein the wobble body (1) and the wobble plate (2) are manufactured via a deep-drawing process using sheet metal.

9. The wobble drive of an axial piston machine for an axial piston pump in a high-pressure cleaning device, comprising a wobble body (1) rotatable around an axis of rotation (D) and a wobble plate (2) inclined to the axis of rotation (D) and driving with a front side thereof at least one piston (2a), a roller bearing (3) positioned between the wobble body (1) and the wobble plate (2), the wobble plate (2) includes a rim (7) overlapping the wobble body (1), rolling bodies (6) of the roller bearing (3) are positioned between the rim (7) and the wobble body (1), the wobble body further including two angular-contact ball bearings (3, 11), one of which is positioned between the wobble plate (2) and the wobble body (1) and the other between the wobble body (1) and a housing, the bearing axis of the second angular-contact ball bearing (11) is coaxial with the axis of rotation (D), the second angular-contact ball bearing (11) includes an outer ring (14) with a disk-shaped part (16) and an axial rim (17), the disk-shaped part (16) is combined as one piece with the rim (17) via a corner section (18), and the ball race (13) is formed on the corner section (18).

10. The wobble drive of claim 9, wherein at least one angular-contact ball bearing (3,11) is provided in which balls (6) roll in the races (4, 5, 12, 13).

11. The wobble drive of claim 10, wherein the hollow cylindrical wobble body (1) incorporates one of the ball races (4) on its end facing the wobble plate (2).

12. The wobble drive of claim 10, wherein one of the ball races (5, 13) is formed on a corner section (8) of the rim (7) combined as one piece with the wobble plate (2).

13. The wobble drive of claim 9, wherein one of the ball races (4, 12) is formed on each of two axial ends of the wobble body (1).

14. The wobble drive of claim 9, wherein the two angular-contact ball bearings (3,13) exhibit an X arrangement.

15. The wobble drive of claim 9, wherein the wobble body (1) and the wobble plate (2) are manufactured via a deep-drawing process using sheet metal.

* * * * *